United States Patent
Lin

(10) Patent No.: US 12,090,786 B1
(45) Date of Patent: Sep. 17, 2024

(54) CASTER DEVICE

(71) Applicant: CATIS PACIFIC MFG. CORP. LTD., Douliou (TW)

(72) Inventor: Ching-Sung Lin, Douliou (TW)

(73) Assignee: CATIS PACIFIC MFG. CORP. LTD., Douliou (TW)

( * ) Notice: Subject to any disclaimer, the term of this patent is extended or adjusted under 35 U.S.C. 154(b) by 83 days.

(21) Appl. No.: 18/181,674

(22) Filed: Mar. 10, 2023

(51) Int. Cl.
*B60B 3/02* (2006.01)
*B60B 33/00* (2006.01)
*B60B 33/02* (2006.01)

(52) U.S. Cl.
CPC ........ *B60B 33/021* (2013.01); *B60B 33/0081* (2013.01); *B60B 33/025* (2013.01)

(58) Field of Classification Search
CPC ............ B60B 33/0081; B60B 33/0078; B60B 33/0086; B60B 33/02; B60B 33/021; B60B 33/023; B60B 33/025
See application file for complete search history.

(56) References Cited

U.S. PATENT DOCUMENTS

| | | | | |
|---|---|---|---|---|
| 3,911,525 A * | 10/1975 | Haussels | ............... | B60B 33/021 16/35 R |
| 4,722,114 A * | 2/1988 | Neumann | ............. | B60B 33/021 16/35 R |
| 5,184,373 A * | 2/1993 | Lange | .................... | B60B 33/00 16/35 R |
| 5,242,035 A * | 9/1993 | Lange | .................... | B60B 33/021 16/35 R |
| 5,303,450 A * | 4/1994 | Lange | ................. | B60B 33/0081 16/35 R |
| 5,774,936 A * | 7/1998 | Vetter | .................... | B60B 33/021 16/35 R |
| 6,298,950 B1 * | 10/2001 | Oelrichs | ............. | B60B 33/0057 188/20 |
| 6,810,560 B1 * | 11/2004 | Tsai | ..................... | B60B 33/0039 16/35 R |
| 6,865,775 B2 * | 3/2005 | Ganance | ............ | B60B 33/0057 16/35 R |
| 7,134,167 B2 * | 11/2006 | Yan | ....................... | B60B 33/021 16/39 |
| 7,182,178 B2 * | 2/2007 | Chung | ...................... | B60T 1/04 188/29 |
| 7,200,894 B2 * | 4/2007 | Block | ................... | A61G 7/0528 16/35 R |

(Continued)

*Primary Examiner* — Jeffrey O'Brien
(74) *Attorney, Agent, or Firm* — Osha Bergman Watanabe & Burton LLP

(57) ABSTRACT

A caster device for a pipe leg includes a caster unit, a mounting unit, and a braking unit. The caster unit includes a wheel seat subunit, a caster subunit that is rotatably connected to a bottom end of the wheel seat subunit, and a protection subunit that is located between the wheel seat subunit and the caster subunit. The mounting unit is mounted to the wheel seat subunit and is adapted to be mounted to the pipe leg. The braking unit extends through the protection subunit and the wheel seat subunit into the mounting unit, and is movable in an up-down direction between a braking position, in which the braking unit projects out of the protection subunit and is in contact with the caster subunit so that the caster subunit is refrained from rotating, and an initial position, in which the braking unit is spaced apart from the caster subunit.

10 Claims, 12 Drawing Sheets

(56) References Cited

U.S. PATENT DOCUMENTS

| | | | | |
|---|---|---|---|---|
| 7,614,115 | B2* | 11/2009 | Yan | B60B 33/0049 |
| | | | | 16/35 R |
| 7,810,613 | B2* | 10/2010 | Lin | B60T 1/04 |
| | | | | 188/69 |
| 7,992,254 | B2* | 8/2011 | Ahn | B60B 33/0073 |
| | | | | 16/35 R |
| 8,087,127 | B2* | 1/2012 | Dayt | B60B 33/0086 |
| | | | | 16/21 |
| 8,424,887 | B1* | 4/2013 | LeMeur, Jr. | B60B 33/04 |
| | | | | 16/45 |
| 8,452,508 | B2* | 5/2013 | Frolik | B60B 33/0005 |
| | | | | 701/1 |
| 9,060,578 | B2* | 6/2015 | Meersschaert | B60B 33/00 |
| 9,108,462 | B1* | 8/2015 | Stone | B60B 33/0023 |
| 9,266,393 | B2* | 2/2016 | Yeo | B60B 33/025 |
| 9,481,206 | B2* | 11/2016 | Block | B60B 33/02 |
| 11,207,917 | B1* | 12/2021 | Lin | B62B 5/0433 |
| 11,801,712 | B2* | 10/2023 | Saito | B60B 33/006 |
| 2007/0056141 | A1* | 3/2007 | Armano | B60B 33/0086 |
| | | | | 16/35 R |
| 2008/0148514 | A1* | 6/2008 | Hancock | B60B 33/0007 |
| | | | | 16/21 |
| 2009/0019670 | A1* | 1/2009 | Tsai | B60B 33/0049 |
| | | | | 16/35 R |
| 2009/0260181 | A1* | 10/2009 | Jones | B60B 7/061 |
| | | | | 16/45 |
| 2012/0160617 | A1* | 6/2012 | Qi | B60T 1/04 |
| | | | | 188/1.12 |
| 2012/0255141 | A1* | 10/2012 | Lin | B60B 33/025 |
| | | | | 16/45 |
| 2016/0121651 | A1* | 5/2016 | Choi | B60B 33/0023 |
| | | | | 16/39 |
| 2017/0106696 | A1* | 4/2017 | Schulte | B60B 33/025 |
| 2023/0201054 | A1* | 6/2023 | Van Loon | B60B 33/025 |
| | | | | 5/600 |
| 2023/0219368 | A1* | 7/2023 | Schulte | B60B 33/0078 |
| | | | | 16/35 R |

\* cited by examiner

CASTER DEVICE

FIELD

This disclosure relates to a caster device that is used to be mounted to one of pipe legs of a movable carrier, and more particularly to a caster device with a brake and capable of directional motion.

BACKGROUND

Referring to FIGS. 1 and 2, a conventional caster device is adapted to be mounted to one of pipe legs of a hospital bed (not shown). The conventional caster device includes a caster unit 11, a mounting unit 12 and a braking unit 13 that are mounted to the caster unit 11, and a control unit 14 that is mounted in the mounting unit 12 and that drives the braking unit 13.

The caster unit 11 includes a wheel seat subunit 111, and a wheel subunit 112 that is rotatably connected to the wheel seat subunit 111 and that is rollable relative to the wheel seat subunit 111 on a ground.

The mounting unit 12 includes a bearing subunit 121 that is disposed on a top portion of the wheel seat subunit 111, and a casing subunit 122 that is inserted into the bearing subunit 121 and that is adapted to be fixedly mounted in the one of the pipe legs of the hospital bed so that the casing subunit 122 is not rotatable relative to the one of the pipe legs.

The braking unit 13 includes a moving rod 131 that is inserted into the bearing subunit 121 and the casing subunit 122 and that is movable relative to the bearing subunit 121 and the casing subunit 122 in an up-down direction, a brake seat 132 that is fixedly mounted to the wheel seat subunit 111 and that is located between the wheel seat subunit 111 and the wheel subunit 112, and a disc member 133 that is fixedly mounted to a bottom end of the moving rod 131 and that is operable to move downwardly to engage the brake seat 132. A lower portion of the moving rod 131 is in a shape of a hexagonal prism so that the moving rod 131 is not rotatable relative to the casing subunit 122 when inserted into the casing subunit 122.

The control unit 14 includes a transmission member 141 that is disposed on a top end of the moving rod 131, a resilient member 142 that resiliently biases the casing subunit 122 and the transmission member 141 away from each other in the up-down direction, and a cam member 143 that is disposed on the transmission member 141. The control unit 14 urges the moving rod 131 and the disc member 133 to move relative to the brake seat 132 via rotation of the cam member 143 thereof so that the disc member 133 is movable between an initial position, in which the disc member 133 is spaced apart from the brake seat 132, and a braking position, in which the disc member 133 engages the brake seat 132. When the disc member 133 is in the braking position, the disc member 133 engages the brake seat 132 that is fixedly mounted to the wheel seat subunit 111. Since the moving rod 131 and the disc member 133 are not rotatable relative to the one of the pipe legs, the brake seat 132, the wheel seat subunit 111, and the wheel subunit 112 are refrained from rotating relative to the one of the pipe legs, thereby orienting motion of the conventional caster device in one direction. At this time, a bottom portion of the brake seat 132 abuts against the wheel subunit 112 and thus refrains the wheel subunit 112 from rolling on the ground. Consequently, the conventional caster device is braked.

Because the disc member 133 and the brake seat 132 are not covered and face the wheel subunit 112, objects like hair, lint, and scraps of paper on the ground may easily accumulate between the brake seat 132 and the disc member 133, which is an issue to be resolved. In addition, a distance between the brake seat 132 and the wheel subunit 112 in the up-down direction may increase due to abrasion of brake seat 132 when the conventional caster device has been used for a long time. As a result, the caster device may not be easily braked, or may not be able to be braked after long-term use, which is another issue to be resolved.

SUMMARY

Therefore, an object of the disclosure is to provide a caster device that can alleviate at least one of the drawbacks of the prior art.

According to the disclosure, the caster device for a pipe leg includes a caster unit, a mounting unit, and a braking unit. The caster unit includes a wheel seat subunit, a caster subunit that is rotatably connected to a bottom end of the wheel seat subunit, and a protection subunit that is positioned in the wheel seat subunit and that is located between the wheel seat subunit and the caster subunit. The mounting unit is mounted to the wheel seat subunit and is adapted to be mounted to the pipe leg. The braking unit extends through the protection subunit and the wheel seat subunit into the mounting unit, and is movable relative to the mounting unit, the wheel seat subunit, and the protection subunit in an up-down direction between a braking position, in which the braking unit projects out of the protection subunit and is in contact with the caster subunit so that the caster subunit is refrained from rotating, and an initial position, in which the braking unit is retracted into the protection subunit and is spaced apart from the caster subunit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
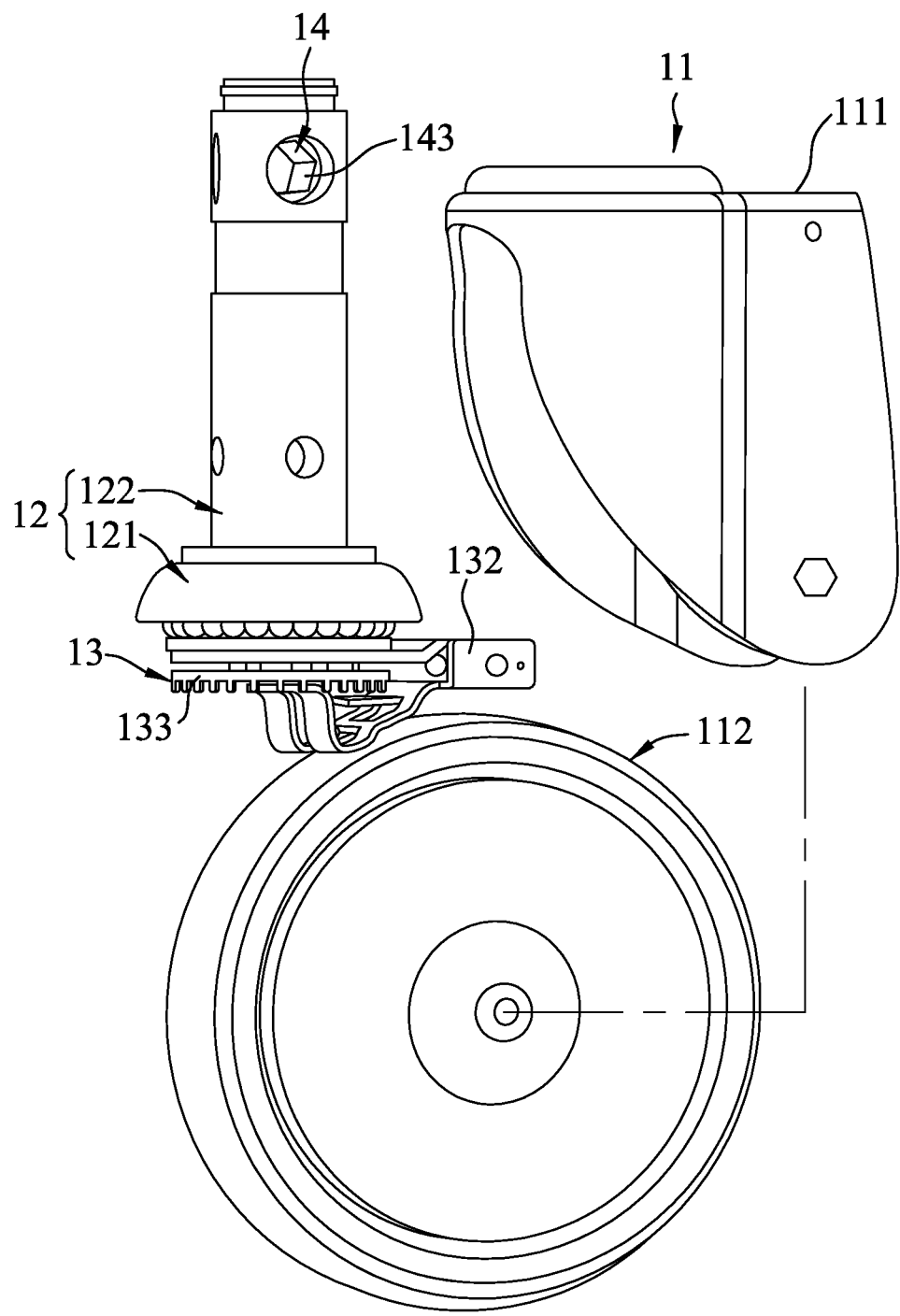
FIG. 1 is a partly exploded perspective view of a conventional caster device.
Figure 2:
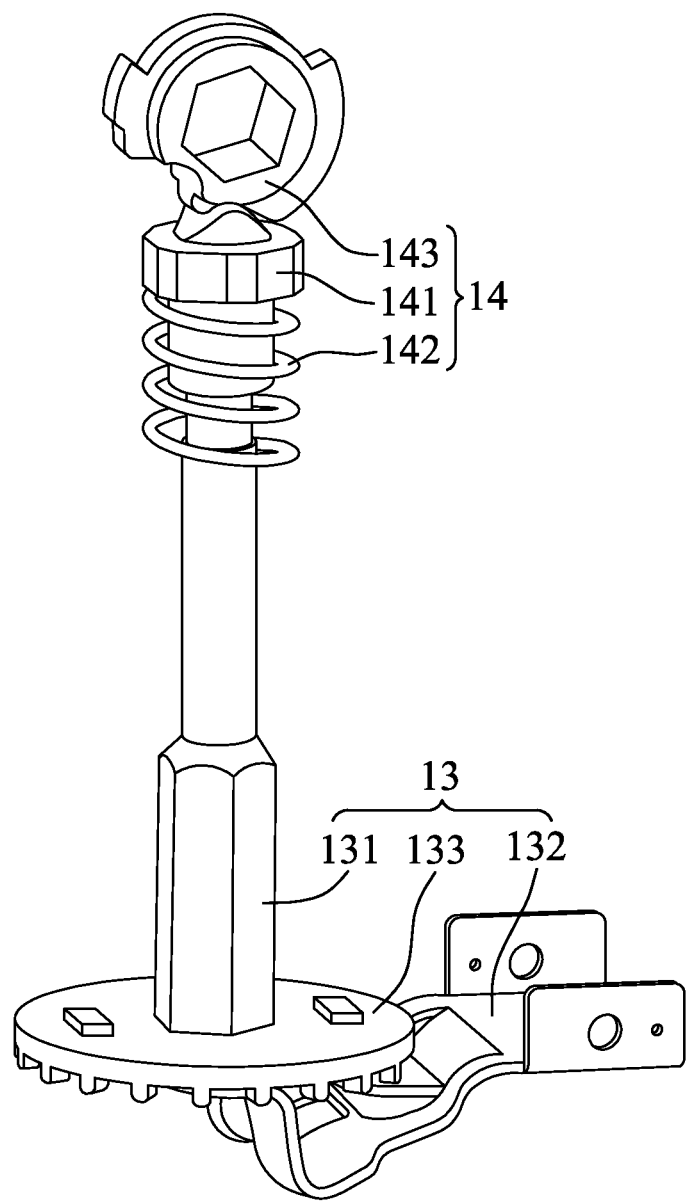
FIG. 2 is a perspective view of a part of the conventional caster device.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 3 to 6, an embodiment of a caster device of according to the disclosure is adapted for use with a pipe leg 9 of a hospital bed (not shown). However, the embodiment may not be limited to be used for the hospital bed, and may be used for any movable carrier as long as the movable carrier is provided with a pipe leg into which the embodiment may be inserted.

Figure 3:
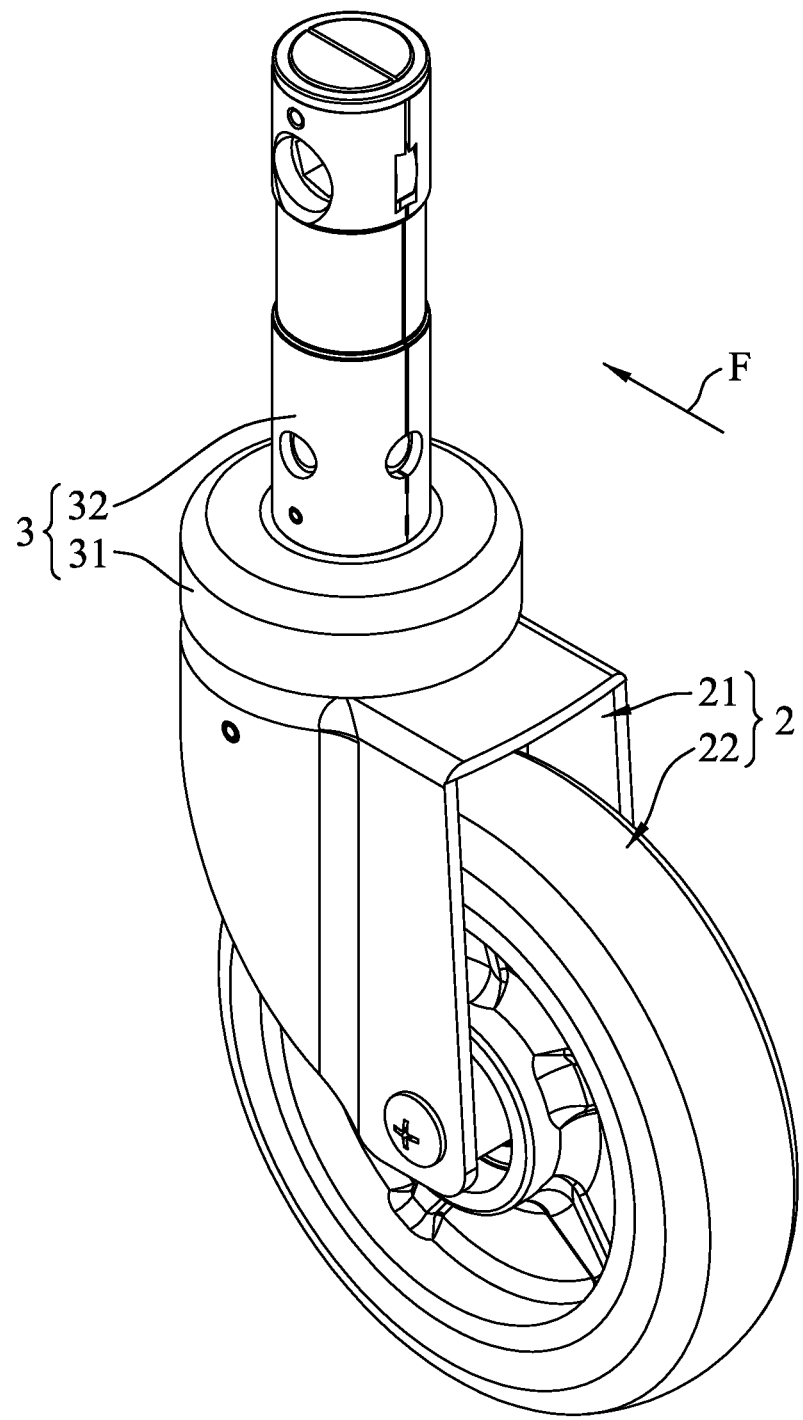
FIG. 3 is a perspective view of an embodiment of a caster device according to the disclosure.
Figure 4:
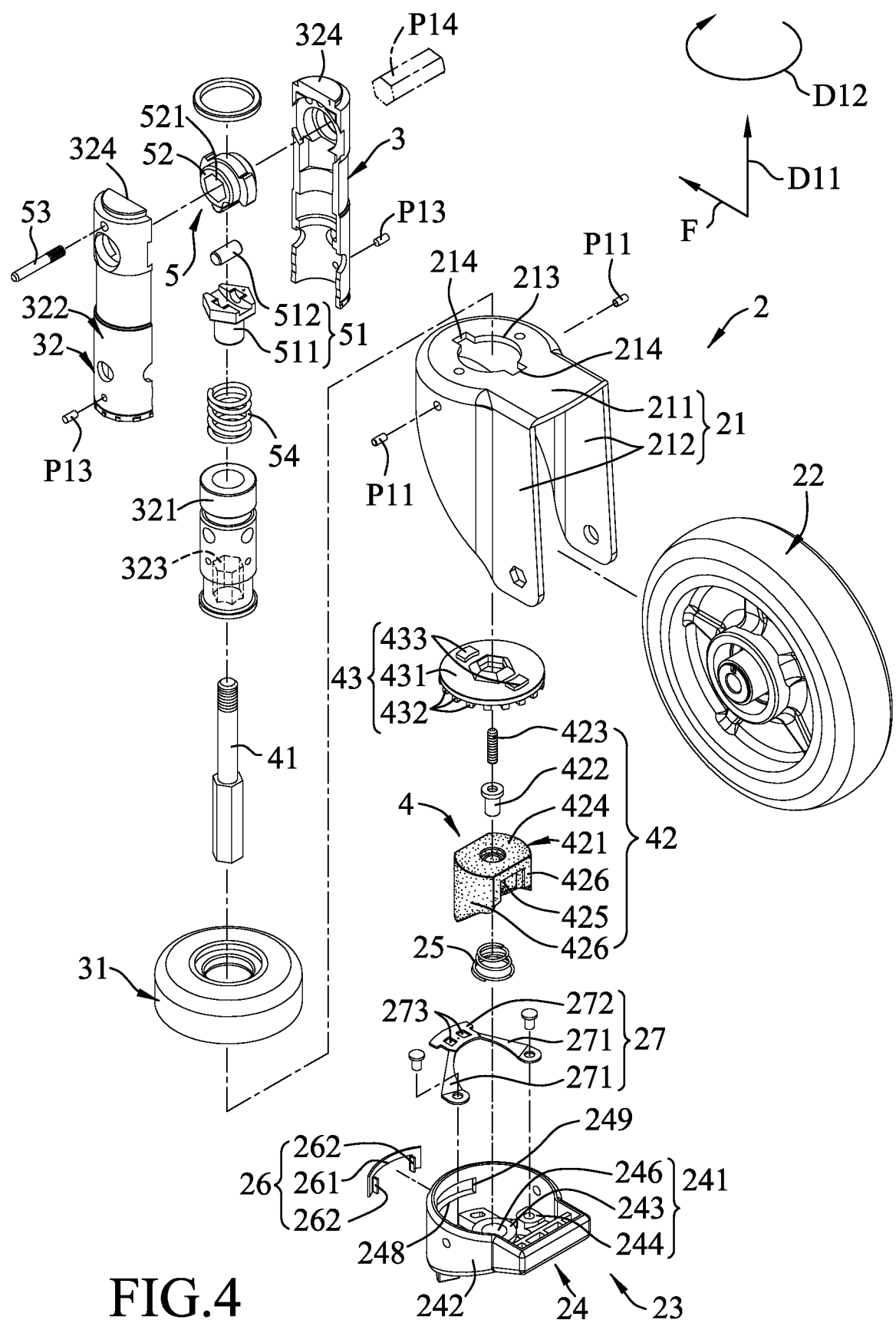
FIG. 4 is an exploded perspective view of the embodiment.

The embodiment includes a caster unit 2, a mounting unit 3 that is mounted to the caster unit 2 and that is adapted to be mounted to the pipe leg 9, a braking unit 4 that is inserted into the mounting unit 3 and the caster unit 2, and a control unit 5 that is disposed in the mounting unit 3. In the following description, an advancing direction of the wheel caster device is defined as a front direction, and the front direction (F) in FIGS. 3 and 4 is defined to be the front direction.

Referring to FIGS. 4 to 6 again, the caster unit 2 includes a wheel seat subunit 21, a caster subunit 22 that is rotatably connected to a bottom end of the wheel seat subunit 21, and a protection subunit 23 that is positioned in the wheel seat subunit 21 and that is located between the wheel seat subunit 21 and the caster subunit 22 in an up-down direction (D11).

The wheel seat subunit 21 includes a top seat wall 211, and two lateral seat walls 212 that respectively extend downwardly and vertically from two opposite sides of the top seat wall 211 in a left-right direction orthogonal to the up-down direction (D11) and the front direction (F). The top seat wall 211 extends in an imaginary plane perpendicular to the up-down direction (D11), and includes a top seat hole 213 that extends through the top seat wall 211 in the up-down direction (D11) and that is configured to be circular, and two engaging grooves 214 that respective extend radially outwardly from two opposite sides of the top seat hole 213 in the front direction (F). The caster subunit 22 is rotatably connected to the lateral seat walls 212.

Since the structure of the caster subunit 22 and the assembly of the caster subunit 22 and the wheel seat subunit 21 are widely-understood by those skilled in the art, a detailed description thereof is omitted.

The protection subunit 23 includes a protection seat 24 that is positioned in the wheel seat subunit 21 via two first pins (P11), a resilient member 25 that is disposed in the protection seat 24, and a protection member 26 and a restraining member 27 that are disposed on the protection seat 24.

Figure 7:
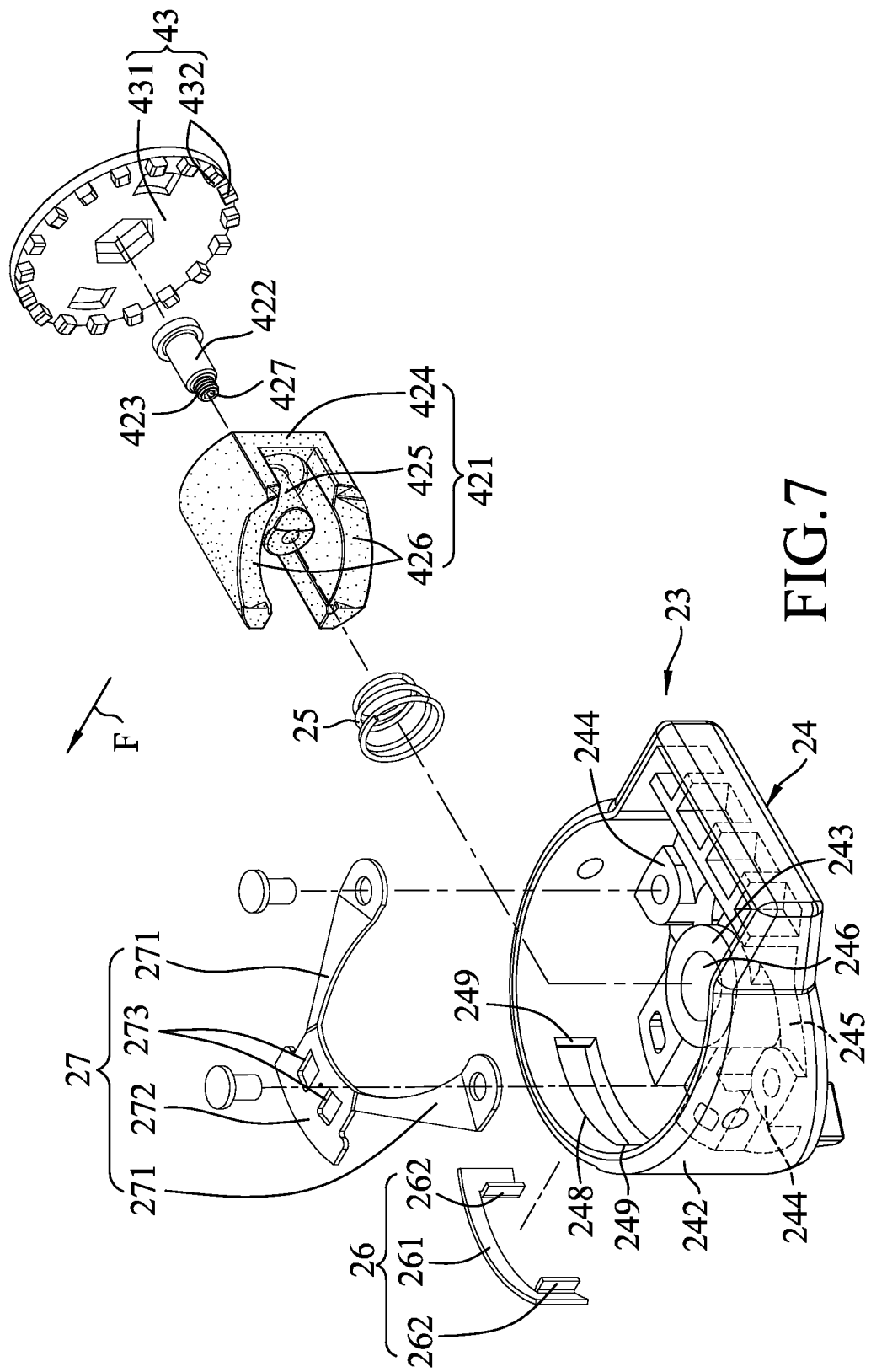
FIG. 7 is an exploded perspective view of a protection subunit, a brake subunit, and a disc member of the embodiment.
Figure 8:
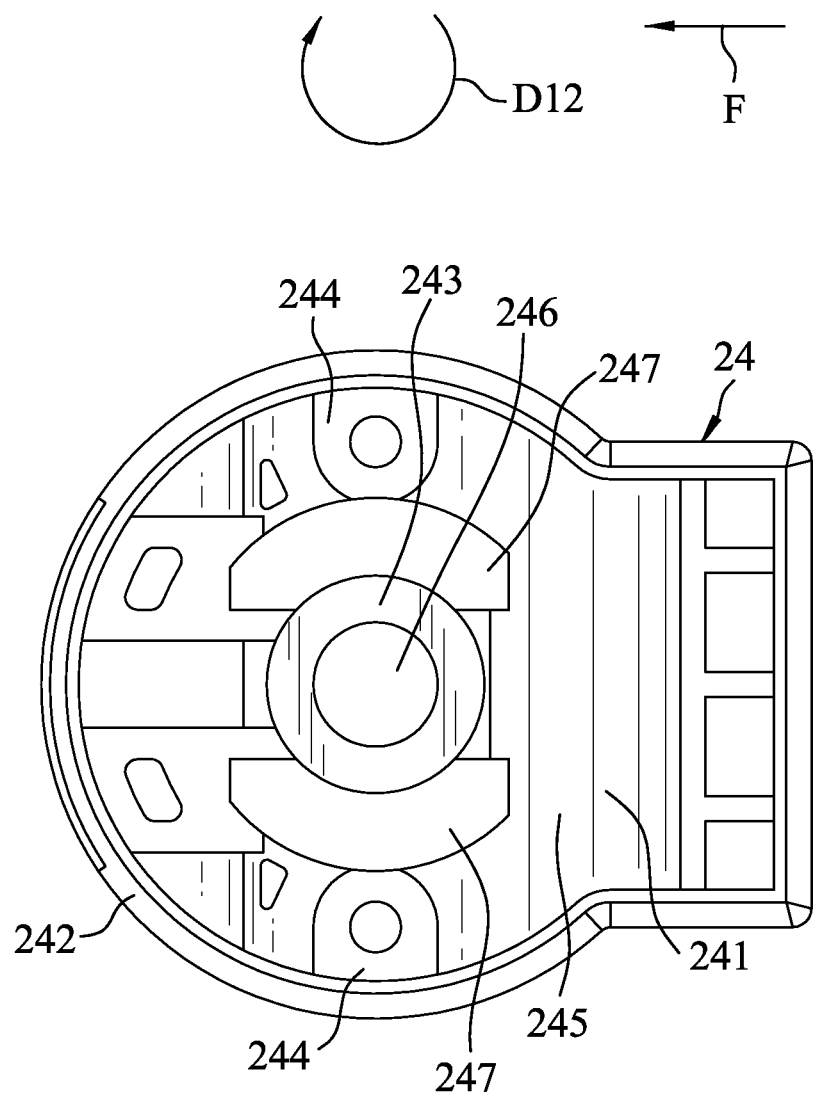
FIG. 8 is a top view of a protection seat of the protection subunit.

Referring further to FIGS. 7 and 8, in cooperation with FIG. 4, the protection seat 24 includes a bottom wall 241, and a surrounding wall 242 that extends upwardly from the bottom wall 241.

The bottom wall 241 includes a center wall portion 243 that is located at a center thereof and that is configured to be annular, two column wall portions 244 that are spaced apart from each other and that are respectively located at two opposite sides of the center wall portion 243 in the left-right direction, and a base wall portion 245 that is connected to the center wall portion 243 and the column wall portions 244, and that extends downwardly when extending forwardly.

The bottom wall 241 is formed with a first insertion hole 246 and two second insertion holes 247. Specifically, the center wall portion 243 defines the first insertion hole 246, and the first insertion hole 246 extends in the up-down direction (D11). The base wall portion 245 is formed with the second insertion holes 247, and each of the second insertion holes 247 extends in the up-down direction (D11) and extends in a circumferential direction (hereinafter also referred to as "the circumferential direction (D12)") of the center wall portion 243 (see FIG. 8). It should be noted that, a circumferential direction of the pipe leg 9 is defined to be identical to the circumferential direction (D12) and will also be referred to as "the circumferential direction (D12)" hereinafter. The second insertion holes 247 cooperatively surround the center wall portion 243 and the first insertion hole 246. The resilient member 25 of the protection subunit 23 is disposed on the center wall portion 243 of the bottom wall 241 (see FIG. 5).

Referring to FIGS. 4, 6, and 7 again, left and right sides of the surrounding wall 242 are respectively connected to the lateral seat walls 212 via the first pins (P11) (i.e., each of the first pins (P11) is inserted into a respective one of the lateral seat walls 212 and the surrounding wall 242) so that the protection seat 24 is positioned in the wheel seat subunit 21. A front portion of the surrounding wall 242 is formed with a restraining hole 248 (see FIG. 5) that extends through the surrounding wall 242 in a radial direction of the pipe leg 9 and that extends in the circumferential direction (D12), and two hole edges 249 (see FIG. 7) that are respectively located at two opposite sides of the restraining hole 248 in the circumferential direction (D12).

Figure 9:
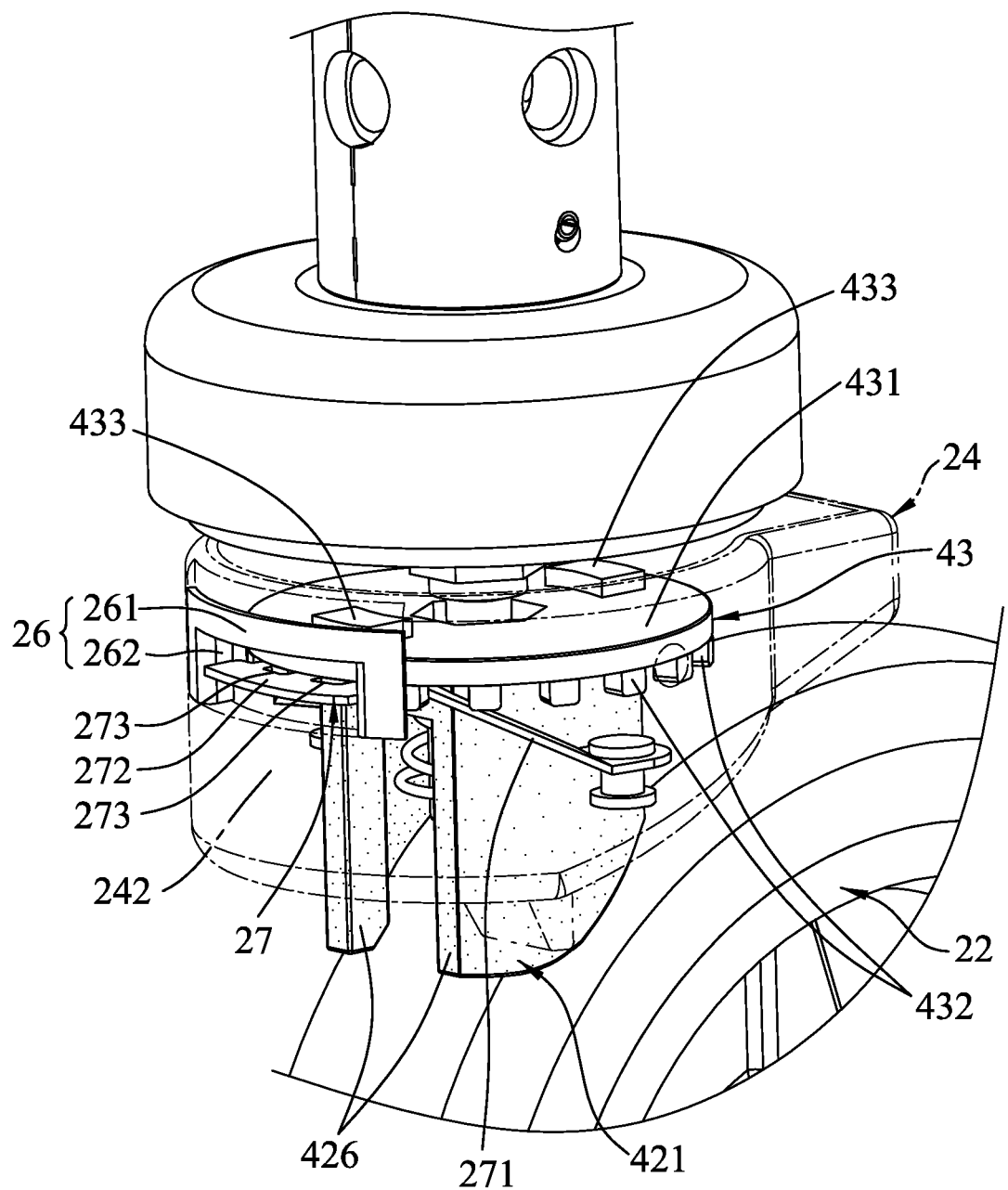
FIG. 9 is a fragmentary perspective view illustrating a configuration of a protective member of the protection subunit and the protection seat.

Referring further to FIG. 9, in cooperation with FIGS. 4 and 7, the protection member 26 is made of a metal material, and includes a main plate section 261 that is configured to be inverted U-shaped, and two side plate sections 262 that respectively protrude from left and right sides of an inner part of the main plate section 261 and that protrude rearwardly. The main plate section 261 cooperates with the side plate sections 262 to cover the hole edges 249.

The restraining member 27 is mounted to the bottom wall 241 and extends into the surrounding wall 242. Specifically, the restraining member 27 includes two wing sections 271 that are respectively riveted to the column wall portions 244 of the bottom wall 241 of the protection seat 24, and an interconnecting plate section 272 that interconnects the wing sections 271. Each of the wing sections 271 extends upwardly and forwardly from the respective one of the column wall portions 244 to the interconnecting plate section 272. The wing sections 271 are concave to each other. The interconnecting plate section 272 is inserted into the restraining hole 248 and is formed with two through holes 273, each of which extends through the interconnecting plate section 272 in the up-down direction (D11).

Referring to FIGS. 4 to 6 again, the mounting unit 3 is adapted to be inserted into the pipe leg 9 (see FIG. 6), and is mounted to the pipe leg 9 via two second pins (P12) so that the mounting unit 3 is not rotatable relative to the pipe leg 9 in the circumferential direction (D12).

The mounting unit 3 is mounted to the wheel seat subunit 21, and includes a bearing subunit 31 that is disposed on a top end of the top seat wall 211 of the wheel seat subunit 21, and a casing subunit 32 that is inserted into the bearing subunit 31.

The wheel seat subunit 21 is rotatable relative to the casing subunit 32 via the bearing subunit 31.

The casing subunit 32 is adapted to be inserted into the pipe leg 9, and is irrotatable relative to the pipe leg 9 in the circumferential direction (D12). The casing subunit 32 includes an inner casing tube 321 and an outer casing tube 322 that is sleeved on a top portion of the inner casing tube 321 (i.e., the top portion of the inner casing tube 321 is inserted into the outer casing tube 322).

The inner casing tube 321 is mounted to the outer casing tube 322 via two third pins (P13) (see FIG. 4). A bottom portion of the inner casing tube 321 protrudes downwardly from the outer casing tube 322 and is inserted into the bearing subunit 31. The bottom portion of the inner casing tube 321 has an inner surrounding surface that defines an inner casing hole 323 having a hexagonal cross section (see FIG. 4).

The outer casing tube 322 includes two half tube sections 324 that cooperatively form in a shape of a hollow cylinder. Since holes that are formed at each of the outer casing tube 322 and the inner casing tube 321 for insertion of the second pins (P12) (see FIG. 6) are the design that is widely-understood by those skilled in the art, a detailed description thereof is omitted.

The braking unit 4 extends through the protection subunit 23 and the wheel seat subunit 21 into the mounting unit 3. The braking unit 4 includes a moving rod 41 that extends in the up-down direction (D11) through the wheel seat subunit 21 and the inner casing tube 321 of the mounting unit 3, a brake subunit 42, and a disc member 43. The moving rod 41 is operable to move relative to the mounting unit 3 and the wheel seat subunit 21 in the up-down direction (D11). The brake subunit 42 abuts against a top end of the resilient member 25, is inserted downwardly into the protection seat 24 of the protection subunit 23, and is located below the moving rod 41. The disc member 43 is mounted to a bottom portion of the moving rod 41, is located between the wheel seat subunit 21 and the protection seat 24 in the up-down direction (D11), and is operable to engage the restraining member 27 such that the wheel seat subunit 21, the protection seat 24, and the caster subunit 22 are refrained from rotating in the circumferential direction (D12) of the pipe leg 9.

An outer surface of a top portion of the moving rod 41 is formed with a thread so as to be threadedly mounted to the control unit 5. The bottom portion of the moving rod 41 has a cross section that is not circular (i.e., the bottom portion of the moving rod 41 is not cylindrical), and is inserted into the inner casing hole 323 of the inner casing tube 321. In this embodiment, the cross section of the bottom portion of the moving rod 41 is hexagonal. Therefore, the moving rod 41 is irrotatable relative to the inner casing tube 321 in the circumferential direction (D12).

Referring to FIGS. 4, 6 and 7 again, the brake subunit 42 includes a brake member 421, a threaded insert member 422, and a stud 423. The brake member 421 is inserted into the protection seat 24. The threaded insert member 422 is inserted into the brake member 421, and has a threaded hole that extends therethrough in the up-down direction (D11). The stud 423 threadably engages the threaded hole the threaded insert member 422 (i.e., the stud 423 is inserted into the brake member 421), projects out of a top end of the threaded insert member 422 (i.e., the stud 423 projects out of a top end of the brake member 421), and abuts against a bottom end of the moving rod 41.

The brake member 421 is located in the protection seat 24, and is surrounded by the surrounding wall 242 of the protection seat 24. The brake member 421 includes a top wall section 424, a cylinder body section 425, and two brake wall sections 426. The top wall section 424 is configured to be annular. The cylinder body section 425 extends downwardly from a center of the top wall section 424, and is configured to be a hollow cylinder that extends in the up-down direction (D11). The brake wall sections 426 are spaced apart from each other in the left-right direction and extend downwardly from the top wall section 424.

The top wall section 424 abuts against the top end of the resilient member 25 of the protection subunit 23 such that the resilient member 25 abuts against the top wall section 424 and the protection seat 24 in the up-down direction (D11) and resiliently biases the top wall section 424 upwardly away from the protection seat 24. The cylinder body section 425 is inserted into the first insertion hole 246 of the protection seat 24. The threaded insert member 422 is inserted into the cylinder body section 245 such that the stud 423 is inserted into the brake member 421 (i.e., the cylinder body section 245 accommodates the threaded insert member 422 and the stud 423).

Each of the brake wall sections 426 extends in the up-down direction (D11), extends in a circumferential direction of the top wall section 424, and is spaced apart from the cylinder body section 425 in a radial direction of the top wall section 424. It should be noted that, the circumferential direction of the top wall section 424 is defined to be identical to the circumferential direction (D12) and will also be referred to as "the circumferential direction (D12)" hereinafter, and the radial direction of the top wall section 424 is defined to be identical to the radial direction of the pipe leg 9 and will be referred to as "the radial direction" hereinafter. The brake wall sections 426 cooperatively surround the cylinder body section 425 (see FIGS. 6 and 7), and are respectively inserted into the second insertion holes 247 (see FIGS. 6 and 8). The stud 423 is threadedly inserted into the threaded insert member 422, and a bottom portion thereof is formed with a hexagonal wrench hole 427 (see FIG. 7) and is for insertion of a hex wrench so that the stud 423 is operable to move relative to the threaded insert member 422 when the hex wrench is inserted into the wrench hole 427 to rotate the stud 423.

The disc member 43 includes a disc main body 431, a plurality of tooth blocks 432, and two engaging blocks 433. The disc main body 431 is in a shape of a disc. The tooth blocks 432 extend downwardly from the disc main body 431, are arranged in the circumferential direction (D12), and are spaced apart from each other. The engaging blocks 433 extend upwardly from the disc main body 431. The disc member 43 is welded to the bottom portion of the moving rod 41 so that the disc member 43 is irrotatable relative to the moving rod 41 and the mounting unit 3 in the circumferential direction (D12).

The control unit 5 includes a transmission subunit 51, a cam member 52, a restraining rod 53, and a resilient component 54. The transmission subunit 51 is mounted to a top end of the moving rod 41 via the thread formed at the top portion of the moving rod 41, and is located in the outer casing tube 322. The cam member 52 is mounted to the outer casing tube 322, surrounds an axis that extends in the left-right direction, and is located above the transmission subunit 51. The restraining rod 53 is located above the cam member 52, extends in the left-right direction, and is inserted into the half tube sections 324 of the outer casing tube 322 in the left-right direction. The resilient component 54 abuts against the transmission subunit 51 and a top end of the inner casing tube 321 in the up-down direction (D11).

The transmission subunit 51 includes a transmission member 511 that surrounds and that is threadedly mounted to the top end of the moving rod 41, and a transmission rod 512 that extends in the left-right direction and that is mounted to a top end of the transmission member 511. The cam member 52 is operable to push the transmission rod 512 downwardly such that the transmission subunit 51 is urged to move downwardly and urges the moving rod 41 to move downwardly.

The cam member 52 is formed with a cam hole 521 that extends therethrough in the left-right direction, and that has a hexagonal cross section. When a driving pin (P14) (see FIG. 4) is inserted into the cam member 52, the cam member 52 rotates upon rotation of the driving pin (P14) (i.e., the driving pin (P14) urges the cam member 52 to co-rotate). Since the technique for urging the moving rod 41 to move in the up-down direction is widely-understood by those skilled in the art, a detailed description of a shape of the cam member 52 is omitted. When the cam member 52 rotates, the cam member 52 pushes the transmission rod 512 downwardly such that the transmission rod 512 urges the transmission member 511 and the moving rod 41 to move downwardly. The resilient component 54 resiliently biases the transmission member 511 upwardly relative to the inner casing tube 321 such that the movable rod 41 is urged to move upwardly relative to the inner casing tube 321 by the transmission member 511 when the transmission rod 512 is free from a pushing force of the cam member 52, or when the cam member 52 is rotated to a certain position that provides sufficient space for the transmission rod 512 to move upwardly.

Figure 5:
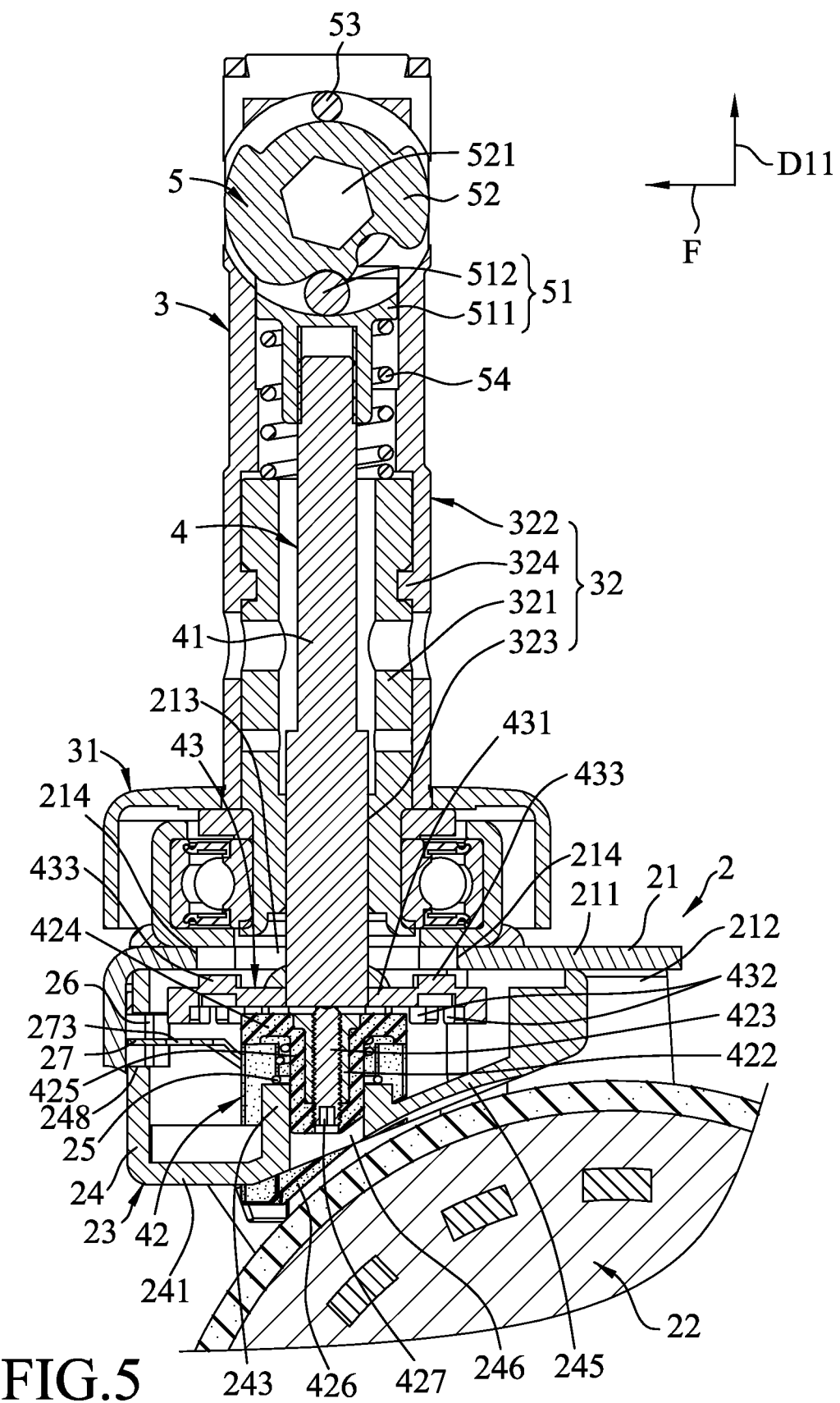
FIG. 5 is a fragmentary, sectional view illustrating a braking unit of the embodiment in an initial position.
Figure 6:
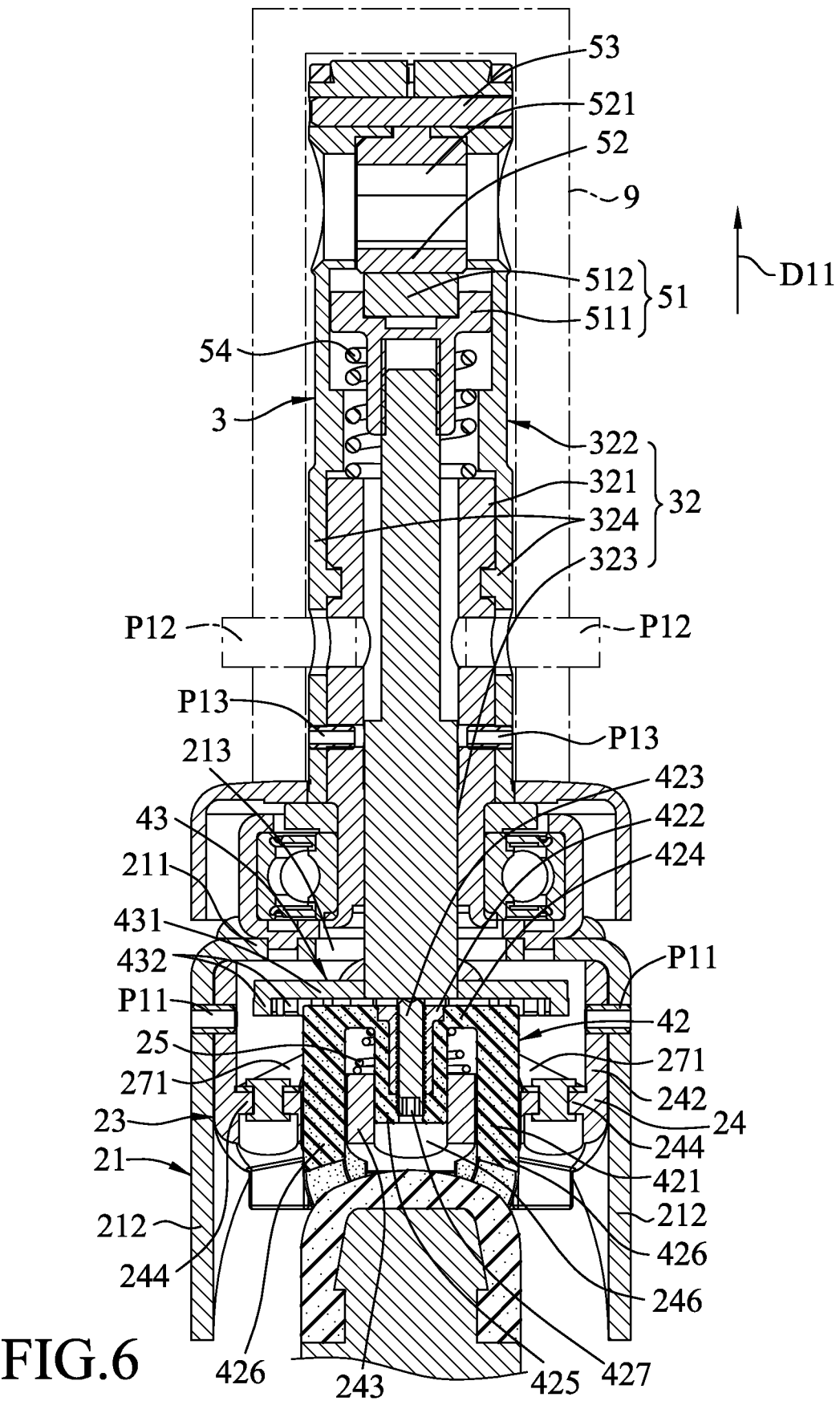
FIG. 6 is another fragmentary, sectional view illustrating the braking unit in the initial position.
Figure 10:
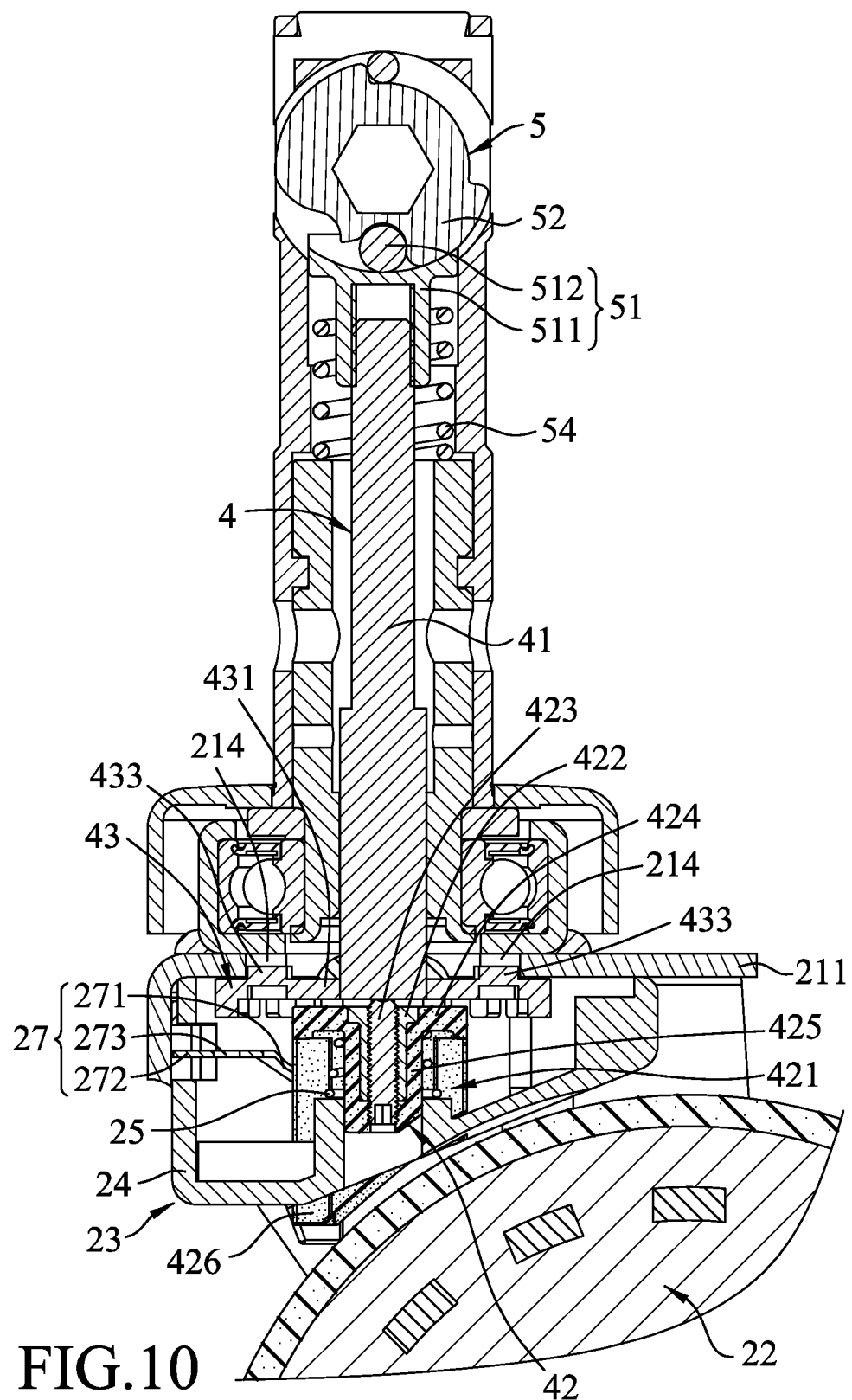
FIG. 10 is a view similar to FIG. 5 but illustrating the braking unit in an orienting position.
Figure 11:
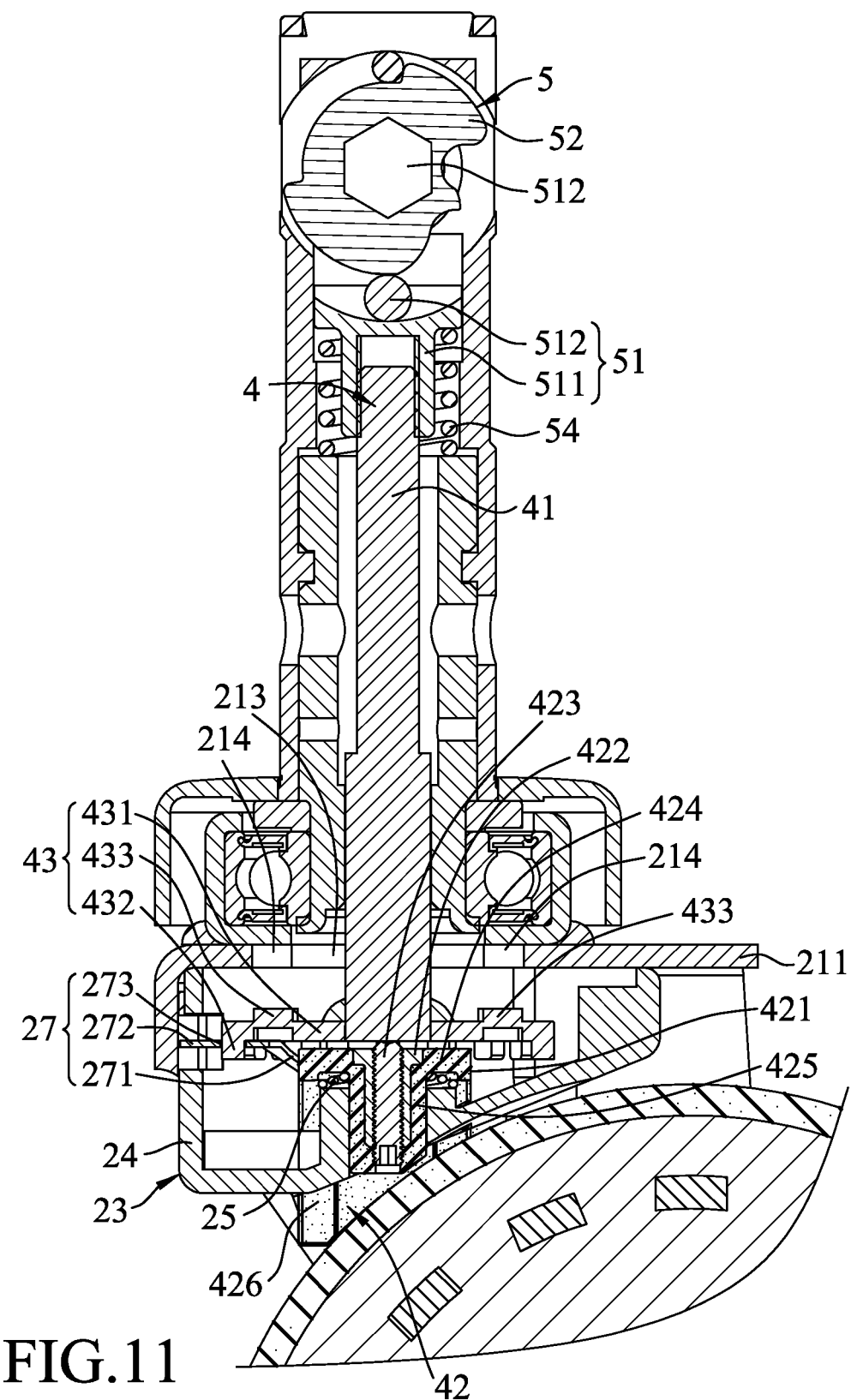
FIG. 11 is a view similar to FIG. 5 but illustrating the braking unit in a braking position.

Referring further to FIGS. 10 and 11, in cooperation with FIG. 5, the braking unit 4 is movable relative to the mounting unit 3, the wheel seat subunit 21, and the protection subunit 23 in the up-down direction (D11) among an initial position (see FIG. 5), an orienting position (see FIG. 10), and a braking position (see FIG. 11).

Referring to FIGS. 4 to 6 again, when the embodiment is inserted and mounted into the pipe leg 9, the outer casing tube 322 and the pipe leg 9 are fixedly assembled by the second pins (P12), the inner casing tube 321 and the outer casing tube 322 are fixedly assembled by the third pins (P13), the moving rod 41 and the inner casing tube 321 are coupled to each other via non-circular structures, and the disc member 43 is fixedly welded to the moving rod 41. Therefore, in this embodiment, the outer casing tube 322, the inner casing tube 321, the moving rod 41, and the disc member 43 is irrotatable in the circumferential direction (D12) relative to the pipe leg 9.

Referring to FIGS. 4 to 6 again, when the braking unit 4 is in the initial position, the disc member 43 of the braking unit 4 is spaced apart from the top seat wall 211 of the wheel seat subunit 21 and the restraining member 27 of the protection subunit 23 in the up-down direction (D11) (i.e., the disc member 43 is located between the top seat wall 211 and the restraining member 27). Thus, the engaging blocks 433 of the disc member 43 do not engage the engaging grooves 214 of the wheel seat subunit 21 (i.e., the engaging blocks 433 are separated from the engaging grooves 214), and the tooth blocks 432 of the disc member 43 do not engage the through holes 273 of the restraining member 27. At this time, the brake subunit 42 of the braking unit 4 is spaced apart from the caster subunit 22 in the up-down direction (D11). Movement of the caster unit 2 is not refrained by the braking unit 4. Therefore, the wheel seat subunit 21, the protection subunit 23, and the caster subunit 22 are rotatable relative to the mounting unit 3 and the braking unit 4 in the circumferential direction (D12), and the caster subunit 22 may roll on the ground.

With regard to FIGS. 4, 5, and 10 again, when the braking unit 4 is in the initial position, the cam member 52 is in a first position (see FIG. 5). Upon the rotation of the driving pin P14 (see FIG. 4), the cam member 52 rotates accordingly. When the cam member 52 rotates to a second position (see FIG. 10), the resilient member 25 of the protection subunit 23 and the resilient component 54 of the control unit 5 respectively push the brake subunit 42 of the braking unit 4 and the transmission member 511 of the control unit 5 upwardly, thereby urging the braking unit 4 to move upwardly to the orienting position as shown in FIG. 10.

When the braking unit 4 is in the orienting position, the disc member 43 of the braking unit 4 engages the top seat wall 211 of the wheel seat subunit 21. Specifically, the engaging blocks 433 of the disc member 43 engage the engaging grooves 214 of the top seat wall 211 such that the wheel seat subunit 21 is refrained from rotating relative to the disc member 43 in the circumferential direction (D12) by the disc member 43, thereby refraining the wheel seat subunit 21, the caster subunit 22, and the protection subunit 23 from rotating relative to the mounting unit 3 in the circumferential direction (D12). Thus, motion of the embodiment is oriented in one direction.

In addition, when the braking unit 4 is in the orienting position, the disc member 43 is spaced apart from the restraining member 27 of the protection subunit 23. Specifically, the tooth blocks 432 of the disc member 43 do not engage the through holes 273 of the restraining member 27. The brake subunit 42 of the braking unit 4 is spaced apart from the caster subunit 22 in the up-down direction, such that the caster subunit 22 is rollable on the ground. That is to say, when the braking unit 4 is in the orienting position, the embodiment is not braked but is oriented to move in a specific direction.

Referring to FIGS. 4, 5, and 11 again, when the cam member 52 is in the first position (see FIG. 5), the cam member 52 may rotate reversely upon reverse rotation of the driving pin P14 (see FIG. 4). When the cam member 52 rotates to a third position (see FIG. 11), the cam member 52 urges the moving rod 41 to move downwardly via the transmission rod 512 and the transmission member 511, thereby urging the disc member 43 to move toward the restraining member 27 of the protection subunit 23. When the moving rod 41 is moved downwardly, the moving rod 41 pushes the brake subunit 42 toward the caster subunit 22, such that the brake member 421 is moved downwardly toward the caster subunit 22, and that the braking unit 4 is urged to move to the braking position.

Referring to FIGS. 4, 9, and 11 again, when the braking unit 4 is in the braking position, the disc member 43 engages the restraining member 27. Specifically, two of the tooth blocks 432 of the disc member 43 are respectively inserted into the through holes 273 of the restraining member 27. The engaging blocks 433 are separated from the engaging grooves 214 (i.e., the disc member 43 is spaced apart from the top seat wall 211 in the up-down direction (D11)). As such, because the restraining member 27 is riveted to the bottom wall 241 of the protection seat 24 and is inserted into the surrounding wall 242 of the protection seat 24, the protection seat 24, the wheel seat subunit 21, and the caster subunit 22 are refrained from rotating in the circumferential direction (D12) by the disc member 43. The motion of the embodiment is oriented in one direction. At this time, the brake wall sections 426 of the brake member 421 project out of the protection seat 24 to be in touch with the caster subunit 22 and to refrain the caster subunit 22 from rotating (i.e., the caster subunit 22 is refrained from rolling on the ground when the brake wall sections 426 abut against the caster subunit 22). Therefore, when the braking unit 4 is in the braking position, the embodiment is not rotatable relative to the pipe leg 9, and is not rollable on the ground. That is to say, the embodiment is oriented in one direction when braked.

Referring to FIGS. 5, 10, and 11 again, the embodiment offers several benefits as follows. When the braking unit 4 is in any one of the initial position, the orienting position, and the braking position, the disc member 43 is covered by the protection seat 24. Therefore, even the caster subunit 22 may be sullied by some dirty objects (e.g., hair), the disc member 43 may still be clear of the accumulation of the dirty objects. Furthermore, when the braking unit 4 is in any one of the initial position and the orienting position, the braking unit 4 is retracted into the protection subunit 23 and is spaced apart from the caster subunit 22. Specifically, most of the brake member 421 is retracted into the protection seat 24 when the braking unit is in any one of the initial and orienting positions. Therefore, the objects on the caster subunit 22 may not easily accumulate on the brake member 421. That is to say, by virtue of the protection seat 24 that is located between the wheel seat subunit 21 and the caster subunit 22 in the up-down direction (D11) covering the disc member 43 and the brake member 421, the accumulation of dirty objects in the embodiment is prevented. Even if the brake wall sections 426 of the brake member 421 are stuck with the dirty objects that are on the caster subunit 22 when braking unit 4 is in the braking position, by virtue of the shapes of the second insertion holes 247 respectively corresponding to the shapes of the brake wall sections 426, and by virtue of the brake wall sections 426 respectively being inserted into the second insertion holes 247, the dirty objects on the brake wall sections 426 may be scraped off by the bottom wall 241 when the brake wall sections 426 are retracted into the protection seat 24 (i.e., when the braking unit 4 moves from the braking position to the initial position or to the orienting position). Thus, the dirty objects may not enter the protection seat 24, thereby achieving prevention of the accumulation of dirty objects.

Figure 12:
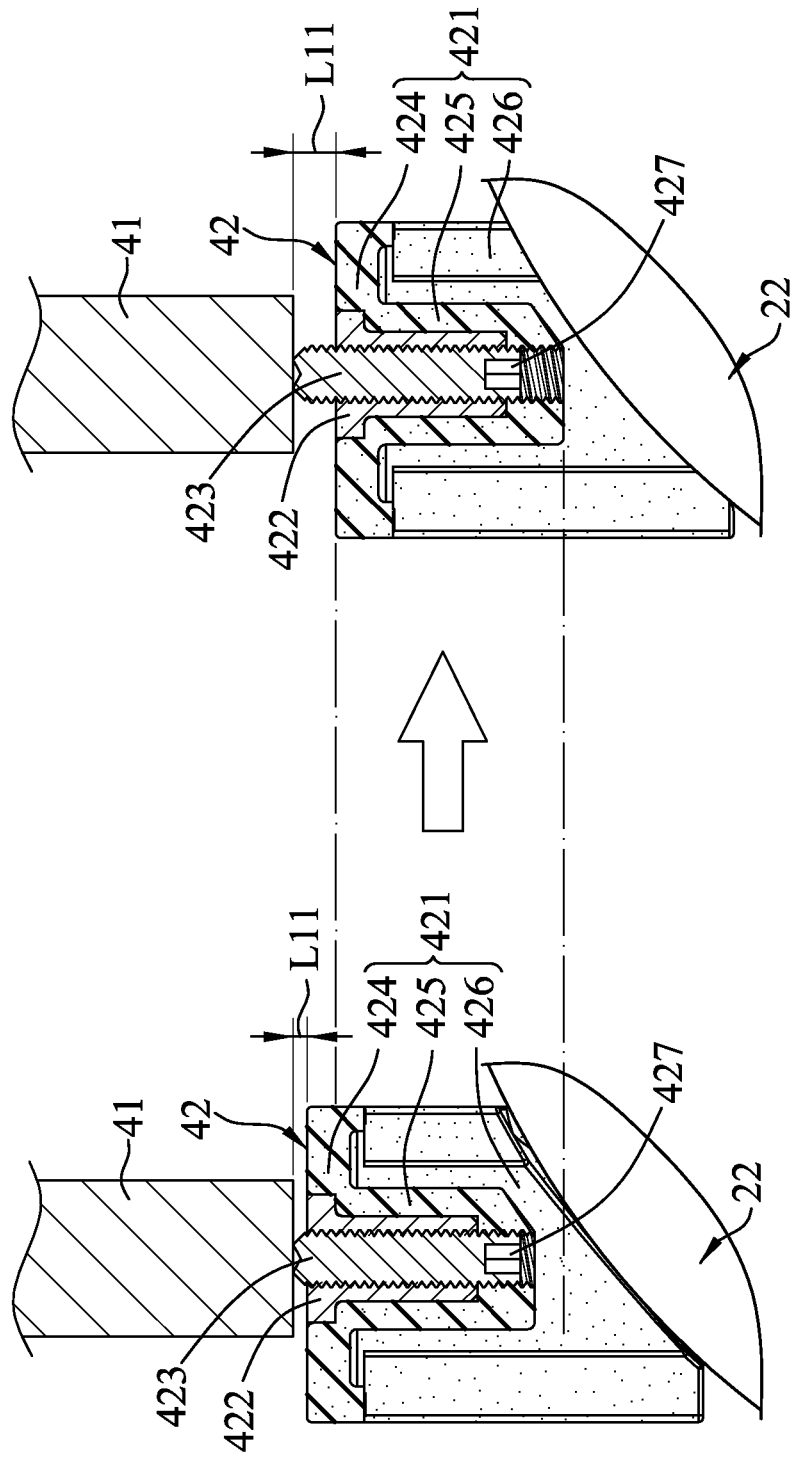
FIG. 12 is a fragmentary schematic view illustrating a function of a stud of the braking unit.

Referring further to FIG. 12, in cooperation with FIGS. 7 and 11, the stud 423 of the brake subunit 42 is movable relative to the brake member 421 in the up-down direction (D11) when being rotated relative to the threaded insert member 422. Thus, as shown in FIG. 12, a distance (L11) between the top end of the brake member 421 and the bottom end of the moving rod 41 (i.e., a length that the stud 423 projects out of the brake member 421) is adjustable according to rotational movement of the stud 423 relative to the brake member 421. That is to say, a distance between the brake member 421 and the caster subunit 22 in the up-down direction (D11) is adjustable. Because the brake member 421 brakes the caster subunit 22 via friction when abutting against the cast subunit 22, abrasion of the brake wall sections 426 is inevitable when the caster device has been used for a long time. Moreover, because the moving rod 41 may only be urged by the cam member 52 to move in the up-down direction (D11) within a certain range, the abrasion of the brake wall sections 426 may affect braking effectiveness of the embodiment. At this time, the caster subunit 22 may be temporarily detached from the wheel seat subunit 21, and then the hex wrench may be inserted into the wrench hole 427 of the stud 423 through the first insertion hole 246 of the center wall portion 243 so that the stud 423 may be rotated relative to the brake member 421 and the threaded insert member 422 upon rotation of the hex wrench. Consequently, the distance (L11) may be adjusted to shorten the distance between the brake member 421 and the caster subunit 22, thereby improving the braking effectiveness of the embodiment.

Referring to FIGS. 5, 7 and 9 again, by virtue of the side plate sections 262 of the protection member 26 covering the hole edges 249, the hole edges 249 may be protected from being notched by the restraining member 27 when the interconnecting plate section 272 of the restraining member 27 moves relative to the protection seat 24 in the left-right direction.

In summary, by virtue of protection provided by the protection subunit 23, the dirty objects may not easily accumulate on the braking unit 4. By virtue of the distance (L11) being adjustable, the braking effectiveness of the caster device may be improved even when the caster device has been used for a long time. The drawbacks of the prior art are thus alleviated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A caster device for a pipe leg, the caster device comprising:
   a caster unit including a wheel seat subunit, a caster subunit that is rotatably connected to a bottom end of the wheel seat subunit, and a protection subunit that is positioned in the wheel seat subunit and that is located between the wheel seat subunit and the caster subunit;
   a mounting unit mounted to the wheel seat subunit and adapted to be mounted to the pipe leg; and
   a braking unit extending through the protection subunit and the wheel seat subunit into the mounting unit, and movable relative to the mounting unit, the wheel seat subunit, and the protection subunit in an up-down direction between a braking position, in which the braking unit projects out of the protection subunit and is in contact with the caster subunit so that the caster subunit is refrained from rotating, and an initial position, in which the braking unit is retracted into the protection subunit and is spaced apart from the caster subunit.

2. The caster device as claimed in claim 1, wherein the protection subunit includes a protection seat that is positioned in the wheel seat subunit, and a resilient member that is disposed in the protection seat, the braking unit including a moving rod that extends in the up-down direction and that extends through the wheel seat subunit into the mounting unit, and a brake subunit that abuts against a top end of the resilient member, that is inserted downwardly into the protection seat, and that is located below the moving rod, the moving rod being operable to move relative to the mounting unit and the wheel seat subunit in the up-down direction, when the moving rod is moved downwardly, the moving rod pushing the brake subunit toward the caster subunit so that the brake subunit projects out of the protection seat to be in contact with the caster subunit and to refrain the caster subunit from rotating, the resilient member resiliently biasing the brake subunit upwardly away from the protection seat.

3. The caster device as claimed in claim 2, wherein the brake subunit includes a brake member that is inserted into the protection seat, and a stud that is inserted into the brake member, that projects out of a top end of the brake member, and that abuts against a bottom end of the moving rod, a distance between the top end of the brake member and the bottom end of the moving rod being adjustable according to rotational movement of the stud relative to the brake member.

4. The caster device as claimed in claim 3, wherein the brake member includes a top wall section that is configured to be annular, a cylinder body section that extends downwardly from the top wall section, that is configured to be hollow, and that accommodates the stud, and at least one brake wall section that extends downwardly from the top wall section, the cylinder body section and the at least one brake wall section being inserted into the protection seat, when the braking unit is in the braking position, the at least one brake wall section being operable to project out of the protection seat to be in contact with the caster subunit and to refrain the caster subunit from rotating, the resilient member of the protection subunit abutting against the top wall section and the protection seat in the up-down direction, and resiliently biasing the top wall section upwardly away from the protection seat.

5. The caster device as claimed in claim 4, wherein the at least one brake wall section includes a plurality of brake wall portions that cooperatively surround the cylinder body section, each of the brake wall portions extending in a circumferential direction of the top wall section, and being spaced apart from the cylinder body section in a radial direction of the top wall section, the protection seat including a bottom wall on which the resilient member is disposed, and a surrounding wall that extends upwardly from the bottom wall and that surrounds the brake member, the bottom wall being formed with a first insertion hole that extends in the up-down direction and a plurality of second insertion holes each of which extends in the up-down direction, the cylinder body section being inserted into the first insertion hole, the brake wall portions being respectively inserted into the second insertion holes.

6. The caster device as claimed in claim 2, wherein the mounting unit is adapted to be irrotatable relative to the pipe leg in a circumferential direction of the pipe leg, the moving rod being irrotatable relative to the mounting unit in the circumferential direction of the pipe leg, the protection seat including a bottom wall into which the brake subunit is inserted, and a surrounding wall that extends upwardly from the bottom wall and that surrounds the brake subunit, the protection subunit further including a restraining member that is mounted to the bottom wall and that extends into the surrounding wall, the braking unit further including a disc member that is mounted to a bottom portion of the moving rod and that is irrotatable relative to the moving rod and the mounting unit in the circumferential direction of the pipe leg, the disc member being located between the wheel seat subunit and the protection seat in the up-down direction, and being operable to engage the restraining member such that the wheel seat subunit, the protection seat, and the caster subunit are refrained from rotating in the circumferential direction of the pipe leg.

7. The caster device as claimed in claim 6, wherein the surrounding wall is formed with a restraining hole that extends through the surrounding wall and that extends in the circumferential direction of the pipe leg, and two hole edges that are located at two opposite sides of the restraining hole in the circumferential direction of the pipe leg, the restraining member being inserted into the restraining hole, the protection subunit further including a protection member that covers the hole edges.

8. The caster device as claimed in claim 6, wherein the wheel seat subunit includes a top seat wall, and two lateral seat walls that extend downwardly from the top seat wall, the caster subunit being rotatably connected to the lateral seat walls, the braking unit being movable further to an orienting position, in which the disc member engages the top seat wall such that the wheel seat subunit and the caster subunit are refrained from rotating relative to the mounting unit in the circumferential direction of the pipe leg, the disc member being spaced apart from the top seat wall in the up-down direction when the braking unit is in any one of the braking position and the initial position.

9. The caster device as claimed in claim 8, wherein the top seat wall of the wheel seat subunit has a top seat hole that extends through the top seat wall in the up-down direction, and an engaging groove that extends radially outwardly from the top seat hole, the disc member including an engaging block that extends upwardly, the engaging block engaging the engaging groove when the braking unit is in the orienting position, the engaging block being separated from the engaging groove when the braking unit is in any one of the initial position and the braking position.

10. The caster device as claimed in claim 2, wherein the mounting unit includes a bearing subunit that is disposed on a top end of the wheel seat subunit, and a casing subunit that is inserted into the bearing subunit and that is adapted to be inserted into the pipe leg, the wheel seat subunit being rotatable relative to the casing subunit via the bearing subunit, the casing subunit including an inner casing tube and an outer casing tube that is sleeved on a top portion of the inner casing tube, a bottom portion of the inner casing tube protruding from the outer casing tube and being inserted into the bearing subunit, the moving rod extending through the inner casing tube, the caster device further comprising a control unit that includes a transmission subunit mounted to a top end of the moving rod and located in the outer casing tube, a resilient component abutting against the transmission subunit and the inner casing tube in the up-down direction, and a cam member mounted to the outer casing tube, surrounding an axis orthogonal to the up-down direction, and located above the transmission subunit, the cam member being operable to push the transmission subunit downwardly to urge the moving rod to move downwardly, the resilient component resiliently biasing the transmission subunit upwardly such that the moving rod is urged to move upwardly by the transmission subunit when the transmission subunit is free from a pushing force of the cam member.

* * * * *